US012722387B2

United States Patent

(12) United States Patent
Yoshida

(10) Patent No.: US 12,722,387 B2
(45) Date of Patent: Sep. 1, 2026

(54) LIQUID EJECTION APPARATUS AND LIQUID STORAGE DEVICE

(71) Applicant: SEIKO EPSON CORPORATION, Tokyo (JP)

(72) Inventor: Masahiko Yoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 18/978,017

(22) Filed: Dec. 12, 2024

(65) Prior Publication Data

US 2025/0196505 A1 Jun. 19, 2025

(30) Foreign Application Priority Data

Dec. 14, 2023 (JP) ................................ 2023-211026

(51) Int. Cl.
*B41J 2/175* (2006.01)

(52) U.S. Cl.
CPC ....... *B41J 2/17566* (2013.01); *B41J 2/17513* (2013.01); *B41J 2/17553* (2013.01); *B41J 2002/17579* (2013.01)

(58) Field of Classification Search
CPC ................ B41J 2/17566; B41J 2/17513; B41J 2002/1757
See application file for complete search history.

(56) References Cited

U.S. PATENT DOCUMENTS

2016/0263900 A1* 9/2016 Kimura ................ B41J 2/17566
2016/0347071 A1* 12/2016 Saeki ........................ B41J 29/02
2022/0339942 A1* 10/2022 Osakabe ............. B41J 2/17566

FOREIGN PATENT DOCUMENTS

JP H06-270410 A 9/1994

* cited by examiner

*Primary Examiner* — Scott A Richmond
(74) *Attorney, Agent, or Firm* — Spencer Fane LLP

(57) ABSTRACT

A liquid ejection apparatus includes a storage container configured to store a liquid having conductivity, a first electrode housed in a first liquid chamber, a second electrode housed in a second liquid chamber, a partition wall configured to partition the first liquid chamber and the second liquid chamber, a detection unit configured to output a detection signal corresponding to an electrical signal from one of the first electrode and the second electrode, and an identification unit configured to identify a remaining amount of the liquid, wherein a first opening is formed below the partition wall, a second opening is formed above the partition wall, and when the liquid stored in the storage container is present in the first opening and the second opening, the first electrode and the second electrode are in contact with the liquid stored in the storage container.

16 Claims, 8 Drawing Sheets

LIQUID EJECTION APPARATUS AND LIQUID STORAGE DEVICE

The present application is based on, and claims priority from JP Application Serial Number 2023-211026, filed Dec. 14, 2023, the disclosure of which is hereby incorporated by reference herein in its entirety.

BACKGROUND

1. Technical Field

The present disclosure relates to a liquid ejection apparatus and a liquid storage device.

2. Related Art

Various techniques for detecting a remaining amount of liquid in a storage container which contains a conductive liquid such as ink have been proposed. For example, JP-A-6-270410 proposes a technique of detecting a remaining amount of liquid in a storage container storing the liquid based on a resistance value between two rod-shaped electrode pins disposed in the storage container.

JP-A-6-270410 is an example of the related art. However, in the related art, since an amount of change in the resistance value between the two electrode pins is minute compared to an amount of change in the remaining amount of the liquid in the storage container, it is difficult to detect the remaining amount of the liquid in the storage container in some cases.

SUMMARY

In order to solve the problems described above, a liquid ejection apparatus according to the present disclosure includes a storage container configured to store a liquid having conductivity, a first electrode housed in a first liquid chamber of the storage container, a second electrode housed in a second liquid chamber of the storage container, a partition wall which is housed in the storage container, and is configured to partition the first liquid chamber and the second liquid chamber, a detection unit which is electrically coupled to the first electrode and the second electrode, and is configured to output a detection signal corresponding to an electrical signal from one of the first electrode and the second electrode, and an identification unit configured to identify a remaining amount of the liquid stored in the storage container based on the detection signal, wherein a first opening communicating the first liquid chamber and the second liquid chamber with each other is formed below the partition wall, a second opening communicating the first liquid chamber and the second liquid chamber with each other is formed above the partition wall, and when the liquid stored in the storage container is present in the first opening and the second opening, the first electrode and the second electrode are in contact with the liquid stored in the storage container.

Further, a liquid storage device according to the present disclosure includes a storage container configured to store a liquid having conductivity, a first electrode housed in a first liquid chamber of the storage container, a second electrode housed in a second liquid chamber of the storage container, a partition wall which is housed in the storage container, and is configured to partition the first liquid chamber and the second liquid chamber, and a detection unit which is electrically coupled to the first electrode and the second electrode, and is configured to output a detection signal corresponding to an electrical signal from one of the first electrode and the second electrode, wherein a first opening communicating the first liquid chamber and the second liquid chamber with each other is formed below the partition wall, a second opening communicating the first liquid chamber and the second liquid chamber with each other is formed above the partition wall, and when the liquid stored in the storage container is present in the first opening and the second opening, the first electrode and the second electrode are in contact with the liquid stored in the storage container.

DESCRIPTION OF EMBODIMENTS

Figure 1:
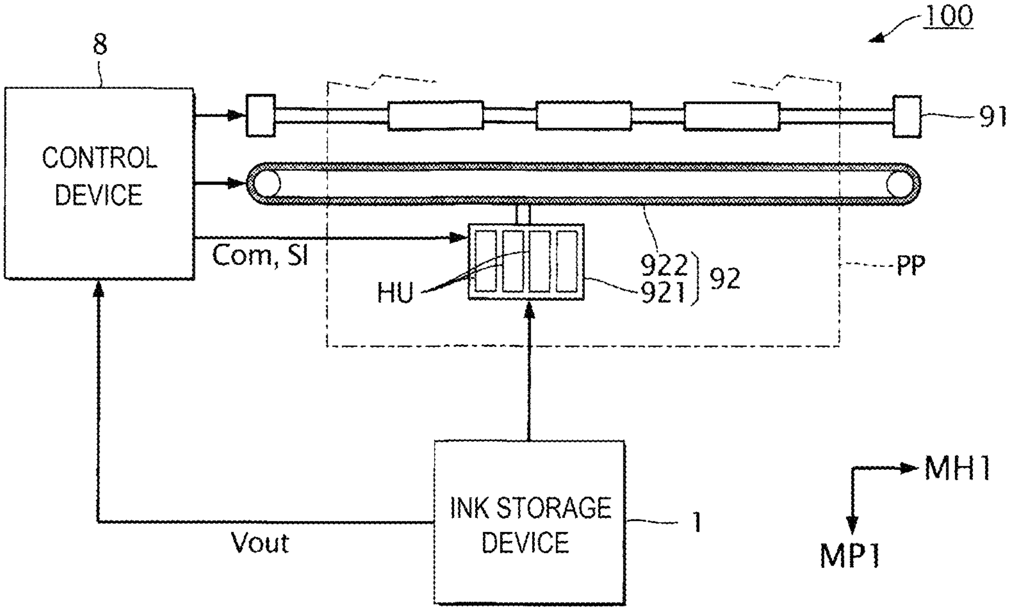
FIG. 1 is a configuration diagram showing an example of an inkjet printer 100 according to an embodiment of the present disclosure.

An aspect for implementing the present disclosure will hereinafter be described with reference to the drawings. However, in the drawings, dimensions and scales of the elements are made different from actual ones as appropriate. Further, the following embodiment is a preferable specific example of the present disclosure and therefore various technically preferable limitations are imposed thereon, however, the scope of the present disclosure is not limited to the embodiment unless there is a description that the present disclosure is limited thereto in particular in the following description.

A. Embodiment

An inkjet printer 100 according to the present embodiment will hereinafter be described.

1. Overview of Inkjet Printer

FIG. 1 is a diagram illustrating an example of a configuration of the inkjet printer 100 according to the present embodiment.

The inkjet printer 100 is an inkjet type printing apparatus that ejects ink IK onto a medium PP. The medium PP is typically printing paper, but any printing object, such as a resin film or fabric, may be used as the medium PP. In the present embodiment, conductive ink is adopted as the ink IK.

In the present embodiment, the inkjet printer 100 is an example of a "liquid ejection apparatus" and the ink IK is an example of a "conductive liquid."

As illustrated in FIG. 1, the inkjet printer 100 includes an ink storage device 1, a control device 8, a plurality of liquid ejection conveyance mechanism 91, and a movement mechanism 92.

The control device 8 includes a processing circuit such as a CPU or an FPGA, and a storage circuit such as a semiconductor memory, and controls each element of the inkjet printer 100. Here, the CPU is an abbreviation for a central processing unit, and the FPGA is an abbreviation for a field programmable gate array.

The conveyance mechanism 91 conveys the medium PP in a sub-scanning direction MP1 under the control of the control device 8.

The movement mechanism 92 reciprocates the plurality of liquid ejection heads HU in a main scanning direction MH1 crossing the sub-scanning direction MP1 and a main scanning direction MH2 opposite to the main scanning direction MH1 based on the control by the control device 8. The movement mechanism 92 includes a housing case 921 that houses the plurality of liquid ejection heads HU, and an endless belt 922 to which the housing case 921 is fixed. The housing case 921 may house the ink storage device 1 together with the liquid ejection heads HU.

The control device 8 supplies the liquid ejection head HU with a drive signal Com for driving the liquid ejection head HU and a control signal SI for controlling the liquid ejection head HU.

The liquid ejection head HU is driven by the drive signal Com based on the control by the control signal SI, and ejects the ink IK from some or all of the plurality of nozzles provided to the liquid ejection head HU. That is, the liquid ejection head HU ejects the ink IK from some or all of the plurality of nozzles in conjunction with the conveyance of the medium PP by the conveyance mechanism 91 and the reciprocation of the liquid ejection head HU by the movement mechanism 92, to cause the ink thus ejected to land on the surface of the medium PP to thereby form a desired image on the surface of the medium PP.

The ink storage device 1 stores the ink IK. Further, the ink storage device 1 supplies the ink IK stored in the ink storage device 1 to the liquid ejection head HU based on the control by the control device 8.

Note that in the present embodiment, the ink storage device 1 is an example of a "liquid storage device."

In the present embodiment, it is assumed when the ink storage device 1 stores M types of ink IK. Here, a value M is a natural number that satisfies $1 \leq M$. More specifically, in the present embodiment, as an example, it is assumed when the ink storage device 1 stores four types of ink IK corresponding to cyan, magenta, yellow, and black. That is, in the present embodiment, when "M=4" is true is assumed as an example.

In the present embodiment, it is assumed when the inkjet printer 100 includes M liquid ejection heads HU corresponding to M types of ink IK. Specifically, in the present embodiment, as an example, it is assumed when the inkjet printer 100 includes four liquid ejection heads HU corresponding to the four types of ink IK.

Note that in the following description, an m-th liquid ejection head HU out of the M liquid ejection heads HU may be referred to as a liquid ejection head HU[m] in some cases. Here, a variable m is a natural number satisfying $1 \leq m \leq M$.

The ink storage device 1 includes an ink amount detection circuit 2 that detects the remaining amount of each type of ink IK stored in the ink storage device 1 and outputs an output signal Vout representing the detection result. The ink amount detection circuit 2 will be described later with reference to FIG. 3.

Note that in the present embodiment, the output signal Vout is an example of a "detection signal."

2. Ink Storage Device

An outline of the ink storage device 1 will hereinafter be described with reference to FIG. 2 to FIG. 7.

Figure 2:
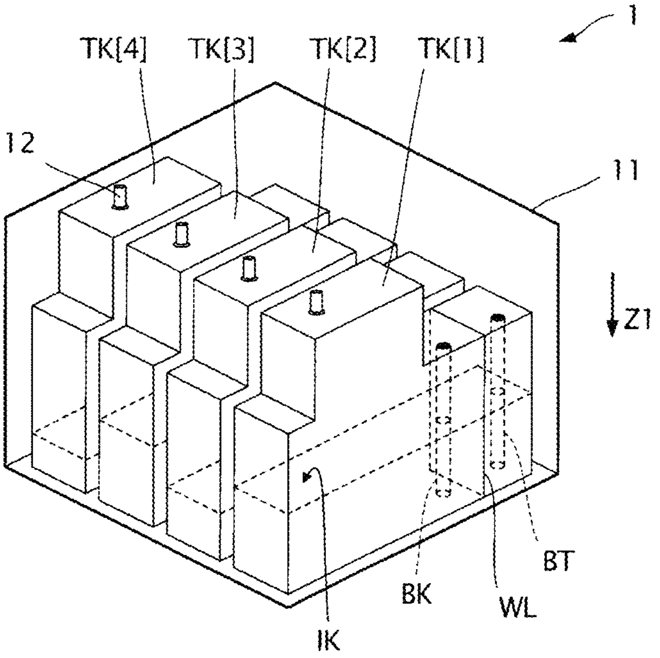
FIG. 2 is a perspective view showing an example of a configuration of an ink storage device 1.

FIG. 2 is a perspective view illustrating an example of the configuration of the ink storage device 1.

As illustrated in FIG. 2, the ink storage device 1 includes M ink tanks TK corresponding one-to-one to the M types of ink IK stored in the ink storage device 1, and a storage case 11 for storing the M ink tanks TK. Specifically, in the present embodiment, the ink storage device 1 includes the four ink tanks TK corresponding one-to-one to the four types of ink IK of cyan, magenta, yellow, and black.

In the present embodiment, the ink tank TK is an example of a "storage container."

The m-th ink tank TK out of the M ink tanks TK may hereinafter be referred to as an ink tank TK[m] in some cases. The ink tank TK[m] stores the ink IK of a type corresponding to the ink tank TK[m], and supplies the ink IK to the liquid ejection head HU[m] corresponding to the ink tank TK[m].

In the present embodiment, the ink tank TK is provided with a supply port 12 for supplying the ink IK to an internal space of the ink tank TK. Further, the ink tank TK houses an electrode rod BT and an electrode rod BK, which are rod-shaped electrodes, and a partition wall WL for partitioning the internal space of the ink tank TK.

Note that in the present embodiment, the electrode rod BT is an example of a "first electrode," and the electrode rod BK is an example of a "second electrode."

A direction in which the ink IK decreases in the ink tank TK when the ink IK is supplied from the ink tank TK to the liquid ejection head HU and the ink IK stored in the ink tank TK decreases will hereinafter be referred to as a Z1 direction. In the present embodiment, as an example, it is assumed when the electrode rod BT and the electrode rod BK are disposed in the ink tank TK so as to extend in the Z1 direction. Note that in the following description, the Z1 direction and the Z2 direction opposite to the Z1 direction are collectively referred to as the Z-axis direction.

Note that in the present embodiment, the Z1 direction is an example of a "downward direction," and the Z2 direction is an example of an "upward direction."

Figure 3:
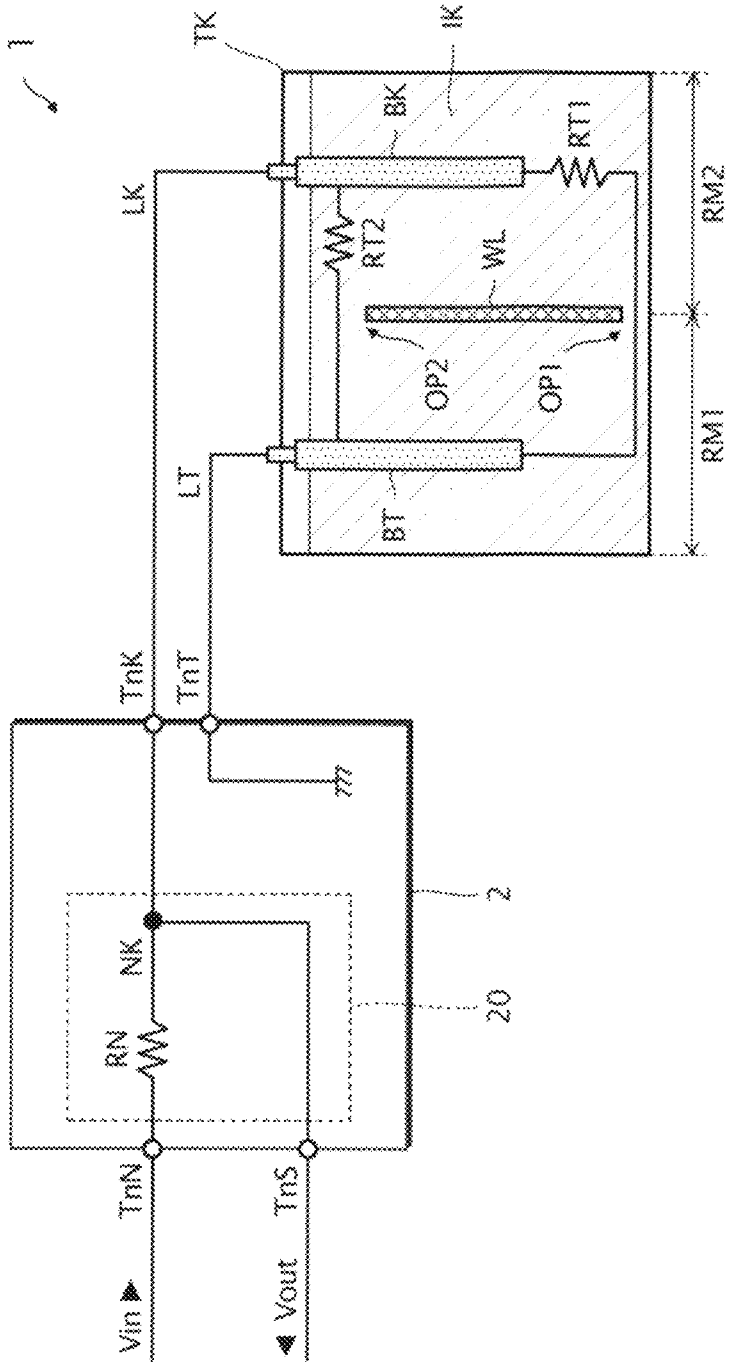
FIG. 3 is a circuit diagram showing an example of a configuration of the ink storage device 1.

FIG. 3 is a circuit diagram illustrating an example of a configuration of the ink storage device 1. Note that in the present embodiment, it is assumed when the M ink amount detection circuits 2 corresponding one-to-one to the M ink tanks TK[1] to TK[M] are provided to the ink storage device 1.

Note that in the present embodiment, the ink amount detection circuit 2 is an example of a "detection unit."

As illustrated in FIG. 3, the ink amount detection circuit 2 includes an output circuit 20, an input terminal TnN, a detection terminal TnK, a reference potential coupling terminal TnT, and an output terminal TnS.

The output circuit 20 includes a node NK and an input resistor RN disposed between the input terminal TnN and the node NK.

The node NK is electrically coupled to the input terminal TnN, the detection terminal Ink, and the output terminal TnS. The detection terminal TnK is electrically coupled to the electrode rod BK via detection wiring LK. The reference potential coupling terminal TnT is electrically coupled to ground wiring set to the ground potential, and is electrically coupled to the electrode rod BT via reference potential coupling wiring LT.

As described above, the electrode rod BT, the electrode rod BK, and the partition wall WL are housed in the ink tank TK. The partition wall WL divides the internal space for the ink tank TK to store the ink IK into an ink liquid chamber RM1 and an ink liquid chamber RM2. The electrode rod BT is housed in the ink liquid chamber RM1. The electrode rod BK is housed in the ink liquid chamber RM2. A lower opening OP1 for communicating the ink liquid chamber RM1 and the ink liquid chamber RM2 with each other is formed at the Z1 direction side of the partition wall WL. An upper opening OP2 for communicating the ink liquid chamber RM1 and the ink liquid chamber RM2 with each other is formed at the Z2 direction side of the partition wall WL.

Note that in the present embodiment, the ink liquid chamber RM1 is an example of a "first liquid chamber," the ink liquid chamber RM2 is an example of a "second liquid chamber," the lower opening OP1 is an example of a "first opening," and the upper opening OP2 is an example of a "second opening."

In the present embodiment, when the ink IK is stored in the ink tank TK and the electrode rod BT and the electrode rod BK are in contact with the ink IK stored in the ink tank TK, the electrode rod BT and the electrode rod BK are electrically coupled to each other via the ink IK stored in the ink tank TK. In the following description, when the electrode rod BT and the electrode rod BK are electrically coupled via the ink IK located in the lower opening OP1 in the ink IK stored in the ink tank TK, the electrical resistance of the ink IK that electrically couples the electrode rod BT and the electrode rod BK to each other with the path via the lower opening OP1 is referred to as an ink resistance RT1. In addition, in the following description, when the electrode rod BT and the electrode rod BK are electrically coupled to each other via the ink IK located in the upper opening OP2 in the ink IK stored in the ink tank TK, the electrical resistance of the ink IK that electrically couples the electrode rod BT and the electrode rod BK to each other with the path via the upper opening OP2 is referred to as an ink resistance RT2.

In the present embodiment, an input signal Vin set to a constant input potential VN is input to the input terminal TnN. Therefore, when the electrode rod BT and the electrode rod BK are electrically coupled to each other via the ink IK stored in the ink tank TK, the potential of the node NK is determined based on the input potential VN of the input signal Vin, the resistance value of the input resistor RN, and the resistance value of the combined resistance of the ink resistance RT1 and the ink resistance RT2. In the present embodiment, since the input potential VN provided to the input signal Vin and the resistance value of the input resistor RN are constant values, it results in that the potential of the node NK is determined based on the resistance value of the combined resistance of the ink resistance RT1 and the ink resistance RT2. Then, an output signal Vout representing the potential of the node NK is output from the output terminal TnS.

In the present embodiment, the control device 8 identifies the remaining amount of the ink IK stored in the ink tank TK based on the output signal Vout output by the output circuit 20.

In the present embodiment, the control device 8 is an example of an "identification unit."

Figure 4:
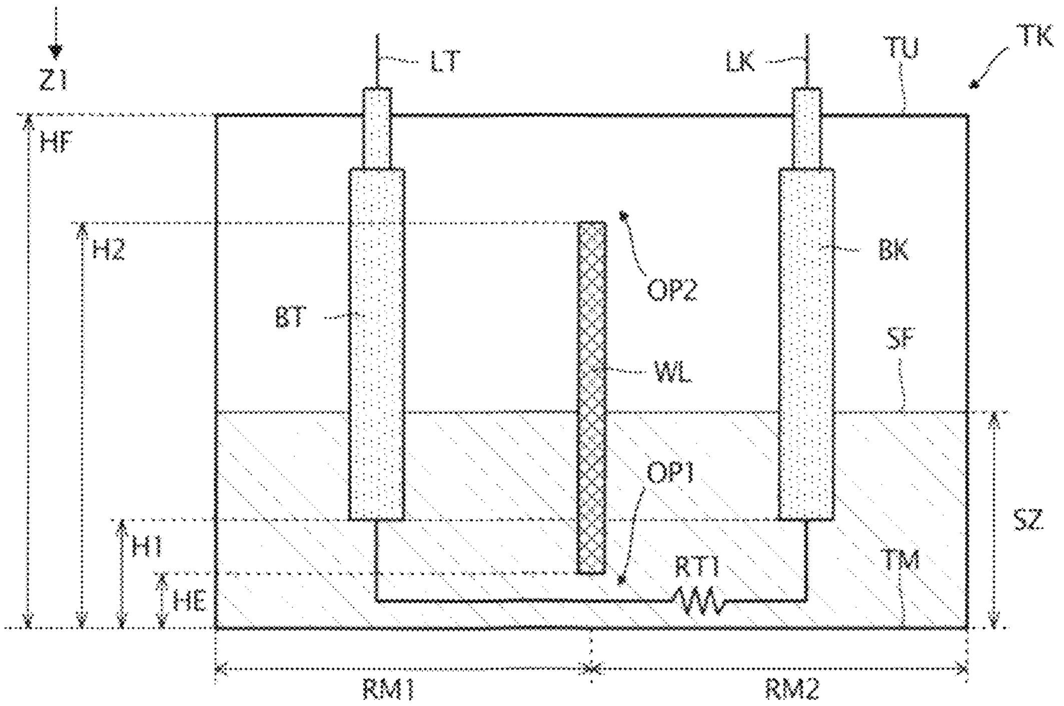
FIG. 4 is a diagram illustrating an example of a configuration of an ink tank TK.
Figure 5:
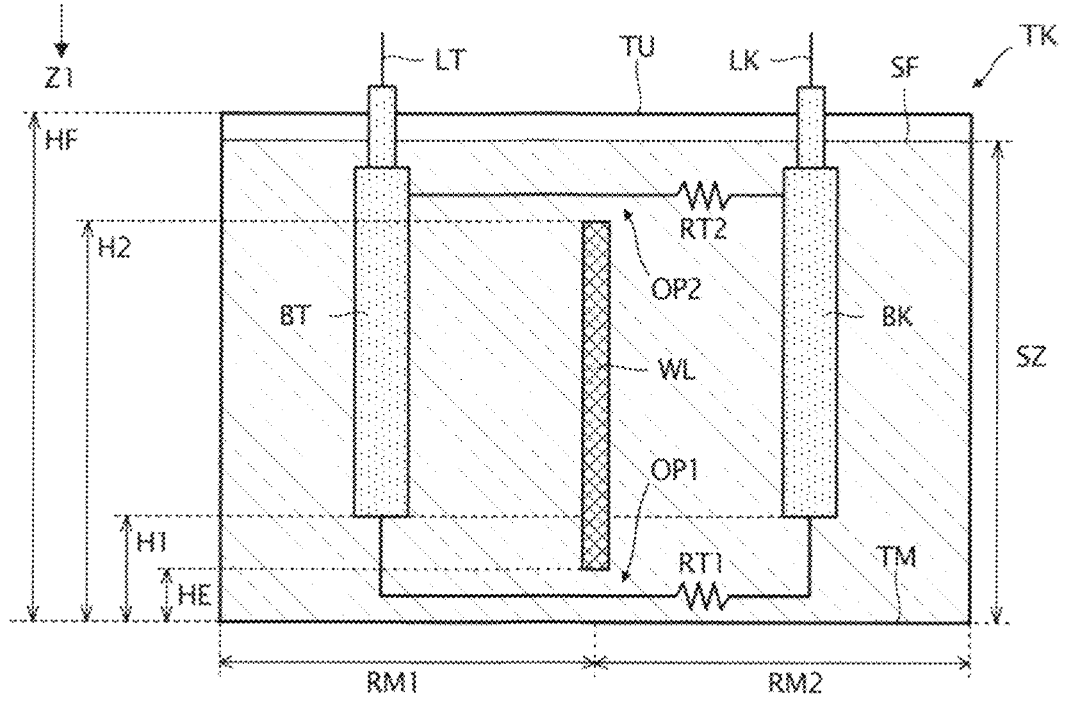
FIG. 5 is a diagram illustrating an example of a configuration of the ink tank TK.

FIG. 4 and FIG. 5 are configuration diagrams illustrating an example of the configuration of the ink tank TK.

As illustrated in FIG. 4 and FIG. 5, the electrode rod BT is housed in the ink tank TK. The electrode rod BT is made of a conductive material, and is electrically coupled to the reference potential coupling line LT on an upper surface TU of the ink tank TK. Further, the electrode rod BT is disposed so that a distance in the Z-axis direction from an end portion in the Z1 direction of the electrode rod BT to a bottom surface TM of the ink tank TK becomes a distance H1.

As illustrated in FIG. 4 and FIG. 5, the electrode rod BK is stored in the ink tank TK. The electrode rod BK is made of a conductive material and is electrically coupled to the detection wiring LK on the upper surface TU of the ink tank TK. The electrode rod BK is provided so that a distance in the Z-axis direction from an end portion in the Z1 direction of the electrode rod BK to the bottom surface TM of the ink tank TK becomes the distance H1.

As illustrated in FIG. 4 and FIG. 5, the partition wall WL is housed in the ink tank TK. The partition wall WL is made of an insulating material. However, the partition wall WL may be formed of a conductive material having a resistance value per unit volume higher than that of the ink IK.

In the present embodiment, as an example, it is assumed when the partition wall WL is disposed such that a distance in the Z-axis direction from an end portion in the Z1 direction of the partition wall WL to the bottom surface TM of the ink tank TK becomes a distance HE, and a distance in the Z-axis direction from an end portion in the Z2 direction of the partition wall WL to the bottom surface TM of the ink tank TK becomes a distance H2. That is, in the present embodiment, as an example, it is assumed that the partition wall WL is disposed such that the lower opening OP1 extends in a range in which a distance in the Z-axis direction from the bottom surface TM is in a range from "0" to the distance HE, and the upper opening OP2 extends in a range in which a distance in the Z-axis direction from the bottom surface TM is in a range from the distance H2 to a distance HF.

Here, the distance HF is a distance in the Z-axis direction from the bottom surface TM to the upper surface TU. The distance HE is a distance shorter than the distance H1. The distance H2 is a distance longer than the distance H1 and shorter than the distance HF. In the present embodiment, it is assumed when a difference value obtained by subtracting the distance H2 from the distance HF is larger than the distance HE. That is, in the present embodiment, it is assumed that the cross-sectional area of the lower opening OP1 is smaller than the cross-sectional area of the upper opening OP2 when the lower opening OP1 and the upper opening OP2 are cut by a plane perpendicular to a direction from the ink liquid chamber RM1 toward the ink liquid chamber RM2.

Note that in the present embodiment, there is assumed when the electrode rod BT and the electrode rod BK are disposed such that the distance in the Z-axis direction from the bottom surface TM to the electrode rod BT and the distance in the Z-axis direction from the bottom surface TM to the electrode rod BK both become the distance H1, but the present disclosure is not limited to such an aspect. The electrode rod BT and the electrode rod BK may be disposed such that longer one of the distance in the Z-axis direction from the bottom surface TM to the electrode rod BT and the distance in the Z-axis direction from the bottom surface TM to the electrode rod BK becomes the distance H1. Further, in the present embodiment, there is assumed when the distance H1 is longer than the distance HE, but the present disclosure is not limited to such an aspect. The distance H1 may be shorter than the distance HE.

A distance in the Z-axis direction from the bottom surface TM of the ink tank TK to a liquid surface SF of the ink IK stored in the ink tank TK is hereinafter referred to as an ink liquid surface distance SZ.

As shown in FIG. 4, when the ink liquid surface distance SZ is greater than or equal to the distance H1 and no greater than the distance H2, the ink IK is present in the lower opening OP1. Further, when the ink liquid surface distance SZ is equal to or greater than the distance H1, the electrode rod BT and the electrode rod BK are electrically coupled to each other with the ink IK located in the lower opening OP1. Therefore, when the ink liquid surface distance SZ is equal to or greater than the distance H1 and no greater than the distance H2, the electrical resistance of the ink IK electrically coupling the electrode rod BT and the electrode rod BK to each other is equal to the ink resistance RT1.

As shown in FIG. 5, when the ink liquid surface distance SZ is greater than the distance H2, the ink IK is present in the lower opening OP1 and the upper opening OP2. Further, when the ink liquid surface distance SZ is greater than the distance H2, the electrode rod BT and the electrode rod BK are electrically coupled to each other with the ink IK which has the ink resistance RT1 and is located in the lower opening OP1, and are electrically coupled to each other with the ink IK which has the ink resistance RT2 and is located in the upper opening OP2. Therefore, when the ink liquid surface distance SZ is greater than the distance H2, the electrical resistance of the ink IK electrically coupling the electrode rod BT and the electrode rod BK to each other is obtained as the combined resistance of the ink resistance RT1 and the ink resistance RT2 when the ink resistance RT1 and the ink resistance RT2 are coupled in parallel to each other.

Note that in the following description, the combined resistance of the ink resistance RT1 and the ink resistance RT2 is referred to as an ink resistance RG. That is, in the present embodiment, the resistance of the ink IK that electrically couples the electrode rod BT and the electrode rod BK to each other is referred to as the ink resistance RG.

3. Reference Example

Figure 6:
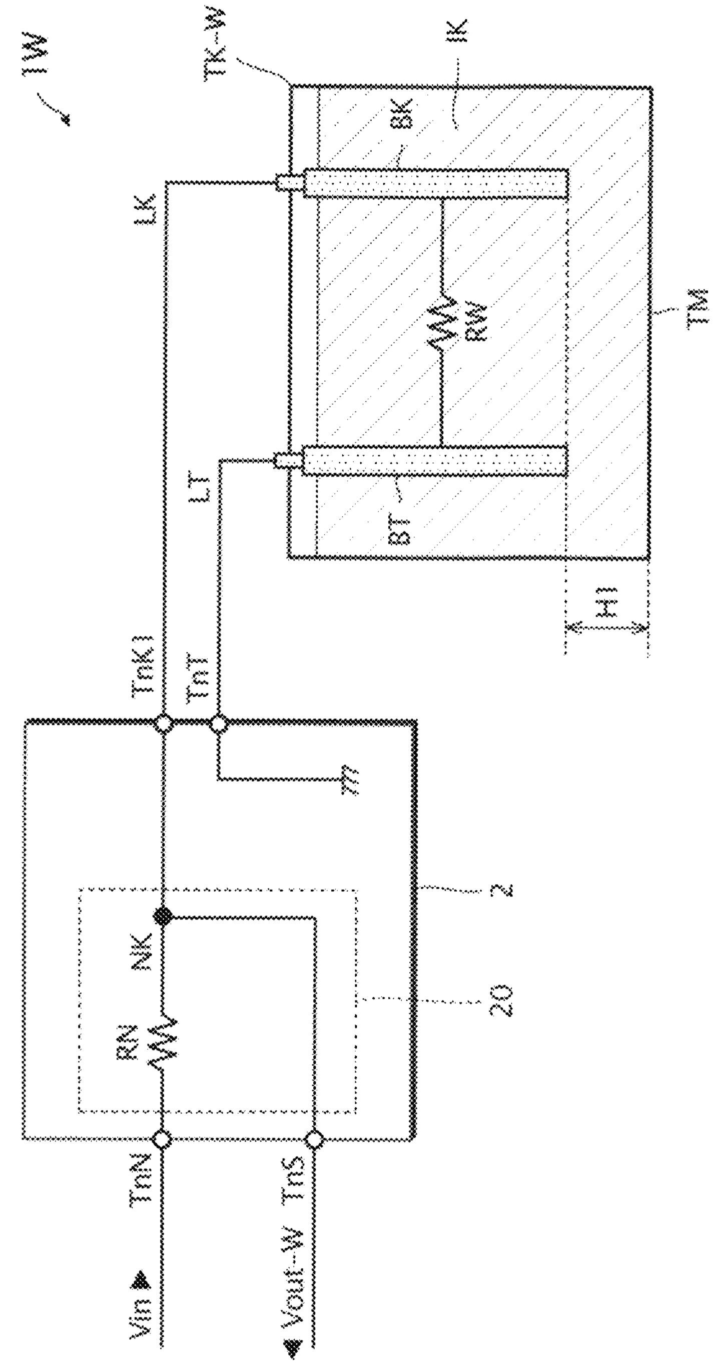
FIG. 6 is a circuit diagram illustrating an example of a configuration of an ink storage device 1W according to a reference example.

An outline of an inkjet printer according to a reference example will hereinafter be described with reference to FIG. 6. Note that the inkjet printer according to the reference example is different from the inkjet printer 100 according to the present embodiment in that an ink storage device 1W is provided instead of the ink storage device 1.

a FIG. 6 is a circuit diagram illustrating configuration of the ink storage device 1W.

As shown in FIG. 6, the ink storage device 1W is different from the ink storage device 1 according to the present embodiment in that an ink tank TK-W is provided instead of the ink tank TK.

The ink tank TK-W is different from the ink tank TK related to the present embodiment in that it does not include the partition wall WL. That is, in the reference example, the electrode rod BT and the electrode rod BK are housed in the ink tank TK-W. In the reference example, it is assumed that similarly to the present embodiment, the electrode rod BT is disposed so that the distance in the Z-axis direction from the end portion in the Z1 direction of the electrode rod BT to the bottom surface TM of the ink tank TK-W becomes the distance H1, and the electrode rod BK is disposed so that the distance in the Z-axis direction from the end portion in the Z1 direction of the electrode rod BK to the bottom surface TM of the ink tank TK-W becomes the distance H1.

Note that in the inkjet printer according to the reference example, when the electrode rod BT and the electrode rod BK have contact with the ink IK stored in the ink tank TK-W, the electrode rod BT and the electrode rod BK are electrically coupled to each other via the ink IK stored in the ink tank TK-W. In the following description, when the electrode rod BT and the electrode rod BK are electrically coupled to each other via the ink IK stored in the ink tank TK-W, the electrical resistance of the ink IK that electrically couples the electrode rod BT and the electrode rod BK to each other is referred to as an ink resistance RW. Further, in the following description, the output signal Vout output by the ink amount detection circuit 2 provided to the ink storage device 1W is referred to as an output signal Vout-W.

Figure 7:
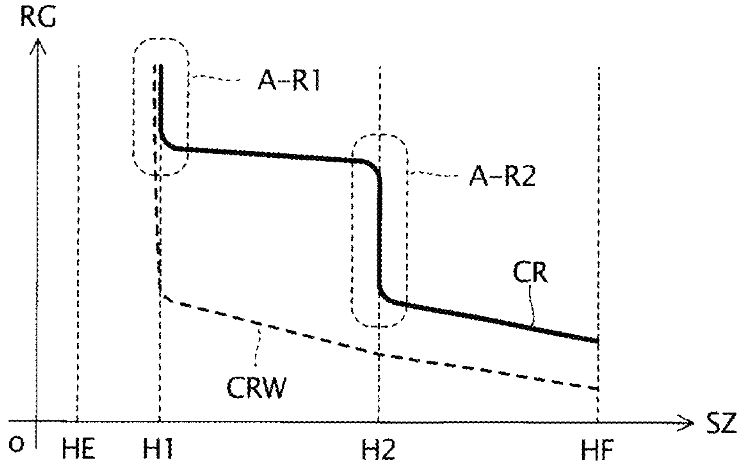
FIG. 7 is a diagram illustrating an example of a relationship between an ink liquid surface distance SZ and the ink resistance RG.

4. Relationship Between Ink Liquid Surface Distance, and Ink Resistance and Output Signal FIG. 7 is a diagram illustrating a resistance value change curve CR related to the present embodiment and a resistance value change curve CRW related to the reference example. Here, the resistance value change curve CR is a curve representing a relationship between a resistance value of the ink resistance RG and the ink liquid surface distance SZ in the present embodiment. Further, the resistance value change curve CRW is a curve representing a relationship between a resistance value of the ink resistance RW and the ink liquid surface distance SZ in the reference example. Note that in FIG. 7, the relationship between the ink liquid surface distance SZ and the resistance value of the ink resistance is represented as the resistance value change curve CR and the resistance value change curve CRW by setting the horizontal axis as the ink liquid surface distance SZ and the vertical axis as the resistance value of the ink resistance.

As described above, in the present embodiment and the reference example, when the ink liquid surface distance SZ is less than the distance H1, the electrode rod BT and the electrode rod BK do not have contact with the ink IK. That is, when the ink liquid surface distance SZ is less than the distance H1, the electrode rod BT and the electrode rod BK are in a state of not being electrically coupled to each other. On the other hand, when the ink liquid surface distance SZ is equal to or greater than the distance H1, the electrode rod BT and the electrode rod BK come into contact with the ink IK. That is, when the ink liquid surface distance SZ is equal to or greater than the distance H1, the electrode rod BT and the electrode rod BK are electrically coupled to each other with the ink IK.

Therefore, as represented by the resistance value change curve CR in FIG. 7, in the present embodiment, when the ink liquid surface distance SZ is equal to or greater than the distance H1, the ink resistance RG takes a smaller resistance value compared to when the ink liquid surface distance SZ is less than the distance H1. That is, it results in that in the present embodiment, the resistance value change curve CR has a change region A-R1 in which the ink resistance RG significantly changes at a boundary between when the ink liquid surface distance SZ is less than the distance H1 and when the ink liquid surface distance SZ is equal to or greater than the distance H1.

Similarly, as represented by the resistance value change curve CRW in FIG. 7, also in the reference example, when the ink liquid surface distance SZ is equal to or greater than the distance H1, the ink resistance RW takes a smaller resistance value compared to when the ink liquid surface distance SZ is less than the distance H1. That is, it results in that the resistance value change curve CRW according to the reference example also has a change region A-R1 in which the ink resistance RW significantly changes at a boundary between when the ink liquid surface distance SZ is less than the distance H1 and when the ink liquid surface distance SZ is equal to or greater than the distance H1 similarly to the resistance value change curve CR related to the present embodiment.

Further, in the present embodiment, when the ink liquid surface distance SZ is equal to or greater than the distance H1 and equal to or less than the distance H2, the electrical resistance of the ink IK electrically coupling the electrode rod BT and the electrode rod BK to each other is maintained at substantially the same resistance value as the resistance value provided to the ink resistance RT1. That is, as represented by the resistance value change curve CR in FIG. 7, in the present embodiment, when the ink liquid surface distance SZ is equal to or greater than the distance H1 and equal to or less than the distance H2, the ink resistance RG is maintained at substantially the same resistance value.

Here, "substantially the same" is a concept including when two things can be assumed to be the same considering the tolerance in addition to when they are completely the same. Specifically, in the present specification, it is assumed that "substantially the same" is a concept including when two things can be assumed to be the same considering the tolerance of about 10%.

On the other hand, in the reference example, when the ink liquid surface distance SZ is equal to or greater than the distance H1, the resistance value of the ink resistance RW decreases as the ink liquid surface distance SZ elongates, and the cross-sectional area of the ink IK that electrically couples the electrode rod BT and the electrode rod BK to each other increases. Therefore, as represented by the resistance value change curve CRW in FIG. 7, in the reference example, when the ink liquid surface distance SZ is equal to or greater than the distance H1, the resistance value of the ink resistance RW decreases as the ink liquid surface distance SZ elongates.

Further, in the present embodiment, when the ink liquid surface distance SZ is longer than the distance H2, the electrode rod BT and the electrode rod BK are electrically coupled to each other with the ink IK which is located in the upper opening OP2 and has the ink resistance RT2 in addition to the ink IK which is located in the lower opening OP1 and has the ink resistance RT1. Further, the resistance value of the combined resistance of the ink resistance RT1 and the ink resistance RT2 when the ink resistance RT1 and the ink resistance RT2 are coupled in parallel to each other is smaller than the resistance value of the ink resistance RT1 alone. Therefore, as represented by the resistance value change curve CR in FIG. 7, in the present embodiment, when the ink liquid surface distance SZ is longer than the distance H2, the ink resistance RG has a smaller resistance value compared to when the ink liquid surface distance SZ is equal to or smaller than the distance H2. That is, it results in that in the present embodiment, the resistance value change curve CR has a change region A-R2 in which the ink resistance RG significantly changes at a boundary between when the ink liquid surface distance SZ is equal to or less than the distance H2 and when the ink liquid surface distance SZ is longer than the distance H2.

On the other hand, in the reference example, the partition wall WL is not provided to the ink tank TK-W. Therefore, as shown in FIG. 7, the resistance value change curve CRW according to the reference example does not have the change region A-R2.

Further, in the present embodiment, when the ink liquid surface distance SZ is longer than the distance H2, the resistance value of the ink resistance RG decreases as the ink liquid surface distance SZ elongates, and the cross-sectional area of the ink IK electrically coupling the electrode rod BT and the electrode rod BK to each other increases. Therefore, as represented by the resistance value change curve CR in FIG. 7, in the present embodiment, when the ink liquid surface distance SZ is longer than the distance H2, the resistance value of the ink resistance RG decreases as the ink liquid surface distance SZ increases.

As described above, both the resistance value change curve CR related to the present embodiment and the resistance value change curve CRW related to the reference example have the change region A-R1.

On the other hand, the resistance value change curve CR related to the present embodiment has the change region A-R2, whereas the resistance value change curve CRW related to the reference example does not have the change region A-R2, but has a smooth shape in which the ink resistance RW continuously decreases as the ink liquid surface distance SZ increases.

Figure 8:
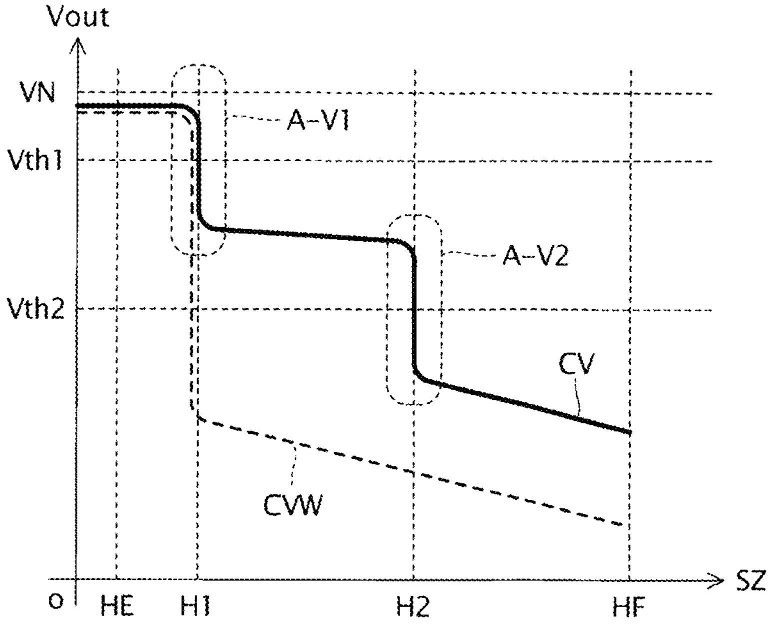
FIG. 8 is a diagram illustrating an example of a relationship between the ink liquid surface distance SZ and an output signal Vout.

FIG. 8 is a diagram illustrating a potential change curve CV related to the present embodiment and a potential change curve CVW related to the reference example. Here, the potential change curve CV means a curve representing a relationship between the output signal Vout output by the ink amount detection circuit 2 in the present embodiment and the ink liquid surface distance SZ. Further, the potential change curve CVW means a curve representing a relationship between the output signal Vout-W output by the ink amount detection circuit 2 in the reference example and the ink liquid surface distance SZ. Note that in FIG. 8, the relationship between the ink liquid surface distance SZ and the potential of the output signal Vout is expressed as the potential change curve CV and the potential change curve CVW by setting the horizontal axis as the ink liquid surface distance SZ and the vertical axis as the potential of the output signal Vout.

As described above, the potential of the output signal Vout, that is, the potential of the node NK, is determined based on the resistance value of the ink resistance RG. Specifically, in the present embodiment, as an example, it is assumed when the potential of the output signal Vout rises when the resistance value of the ink resistance RG is high compared to when the resistance value is low.

As described above, the resistance value change curve CR has the change region A-R1. Therefore, as shown in FIG. 8, the potential change curve CV also has a change region A-V1, which is a region in which the potential of the output signal Vout significantly changes, at the boundary between when the ink liquid surface distance SZ is less than the distance H1 and when the ink liquid surface distance SZ is equal to or greater than the distance H1.

Further, as described above, the resistance value change curve CRW also has the change region A-R1. Therefore, as shown in FIG. 8, the potential change curve CVW also has a change region A-V1, which is a region in which the potential of the output signal Vout-W significantly changes, at the boundary between when the ink liquid surface distance SZ is less than the distance H1 and when the ink liquid surface distance SZ is equal to or greater than the distance H1.

Further, as described above, the resistance value change curve CR has the change region A-R2. Therefore, as shown in FIG. 8, the potential change curve CV also has a change region A-V2, which is a region in which the potential of the output signal Vout significantly changes, at the boundary between when the ink liquid surface distance SZ is equal to or less than the distance H2 and when the ink liquid surface distance SZ is longer than the distance H2.

Note that as described above, the resistance value change curve CRW does not have the change region A-R2. Therefore, the potential change curve CVW also does not have the change region A-V2 as shown in FIG. 8.

A potential represented by the output signal Vout related to the present embodiment when the temperature of the ink IK in the ink tank TK is the reference temperature t1 and the ink liquid surface distance SZ in the ink tank TK is the distance H1 is hereinafter referred to as a threshold potential Vth1. Note that as shown in FIG. 8, a potential represented by the output signal Vout-W in the reference example when the temperature of the ink IK in the ink tank TK-W is the reference temperature t1 and the ink liquid surface distance SZ in the ink tank TK-W is the distance H1 also becomes the threshold potential Vth1.

Further, a potential represented by the output signal Vout in the present embodiment when the temperature of the ink IK in the ink tank TK is the reference temperature t1 and the ink liquid surface distance SZ in the ink tank TK is the distance H2 is hereinafter referred to as a threshold potential Vth2. Note that as shown in FIG. 8, a potential represented by the output signal Vout-W represented by the potential change curve CVW in the reference example when the temperature of the ink IK in the ink tank TK-W is the reference temperature t1 and the ink liquid surface distance SZ in the ink tank TK-W is the distance H2 becomes a potential lower than the threshold potential Vth2.

Here, the reference temperature t1 means, for example, the temperature of the ink IK in the ink tank TK when the inkjet printer 100 is used in a standard use environment of the inkjet printer 100. The reference temperature t1 may be, for example, an ambient temperature of the inkjet printer 100 when the inkjet printer 100 is used in the standard use environment of the inkjet printer 100. Further, the reference temperature t1 may be, for example, a temperature of a standard use environment of the ink IK.

As described above, in the present embodiment, the control device 8 identifies the remaining amount of the ink IK stored in the ink tank TK based on the output signal Vout.

Specifically, in the present embodiment, the control device 8 identifies that the remaining amount of the ink IK in the ink tank TK is less than the ink amount corresponding to the distance H1 when the potential of the output signal Vout is higher than the threshold potential Vth1, and identifies that the remaining amount of the ink IK in the ink tank TK is larger than the ink amount corresponding to the distance H1 when the potential of the output signal Vout is lower than the threshold potential Vth1.

Here, the ink amount corresponding to the distance H1 is an amount based on the minimum amount of the ink IK in the ink tank TK. Specifically, the amount based on the minimum amount of the ink IK in the ink tank TK may be a minimum amount of ink which is necessary for the liquid ejection head HU to eject the ink IK using the ink IK supplied from the ink tank TK, or may be an amount of ink the difference of which from the minimum amount of ink is equal to or less than a first difference amount. Here, the first difference amount may be, for example, an amount of ink equal to or less than an amount of ink necessary for the inkjet printer 100 to form an image on a predetermined number of sheets of the medium PP, or an amount of ink with which the ink IK can be ejected from the liquid ejection head HU a predetermined number of times or less. That is, the amount of ink corresponding to the distance H1 may be an amount of ink corresponding to a state called "ink end."

Note that in the present embodiment, the amount of ink corresponding to the distance H1 is an example of the "amount based on the minimum amount of liquid in the storage container."

Further, in the present embodiment, the control device 8 identifies that the remaining amount of the ink IK in the ink tank TK is less than the ink amount corresponding to the distance H2 when the potential of the output signal Vout is higher than the threshold potential Vth2, and identifies that the remaining amount of the ink IK in the ink tank TK is larger than the amount of ink corresponding to the distance H2 when the potential of the output signal Vout is lower than the threshold potential Vth2.

Here, the amount of ink corresponding to the distance H2 means an amount based on the maximum amount of the ink IK in the ink tank TK. Specifically, the amount based on the maximum amount of ink IK in the ink tank TK may be the maximum amount of ink that can be stored in the ink tank TK, or may be an amount of ink the difference of which from the maximum amount of ink is equal to or less than a second difference amount. Here, the second difference amount may be, for example, an amount of ink that can be supplied within a predetermined time when a user of the inkjet printer 100 supplies the ink IK from the bottle containing the ink IK to the inside of the ink tank TK via the supply port 12. Further, for example, the second difference amount may be a minimum amount of ink IK that can be supplied by the user of the inkjet printer 100 to the ink tank TK with the bottle in which the ink IK is stored. That is, the amount of ink corresponding to the distance H2 may be an amount of ink corresponding to a state called "full."

Note that in the present embodiment, the amount of ink corresponding to the distance H2 is an example of the "amount based on the maximum amount of liquid in the storage container."

Further, in the reference example, similarly to the present embodiment, the control device 8 identifies that the remaining amount of the ink IK in the ink tank TK-W is less than the amount of ink corresponding to the distance H1, when the potential of the output signal Vout-W is higher than the threshold potential Vth1, and identifies that the remaining amount of the ink IK in the ink tank TK-W is larger than the amount of ink corresponding to the distance H1 when the potential of the output signal Vout-W is lower than the threshold potential Vth1.

On the other hand, in the reference example, unlike the present embodiment, the control device 8 cannot identify whether the remaining amount of the ink IK in the ink tank TK-W is less than the amount of ink corresponding to the distance H2 based on the determination result of whether the potential of the output signal Vout-W is higher than the threshold potential Vth2.

Figure 9:
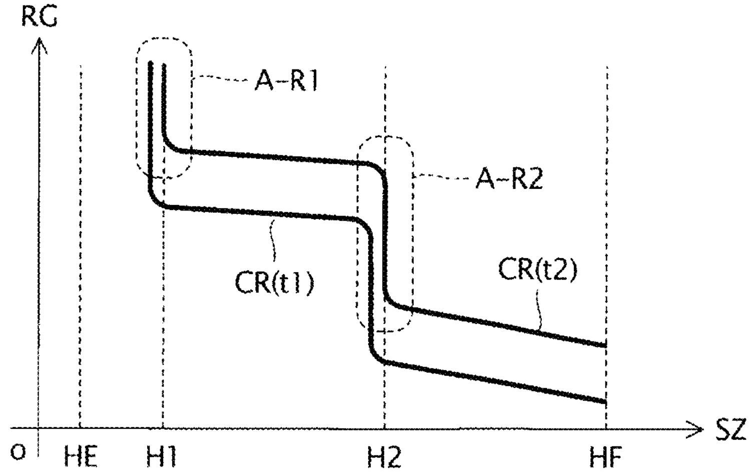
FIG. 9 is a diagram illustrating an example of a temperature change in a resistance value change curve CR.

FIG. 9 is a diagram illustrating a temperature change of the resistance value change curve CR with the temperature change of the ink IK in the ink tank TK related to the present embodiment.

Specifically, in FIG. 9, the resistance value change curve CR when the temperature of the ink IK in the ink tank TK is the reference temperature t1 is represented as a resistance value change curve CR(t1), and the resistance value change curve CR when the temperature of the ink IK in the ink tank TK is a temperature t2 different from the reference temperature t1 is represented as a resistance value change curve CR(t2).

As shown in FIG. 9, when the temperature of the ink IK in the ink tank TK changes, the resistance value represented by the resistance value change curve CR also changes. Specifically, when the temperature of the ink IK in the ink tank TK changes from the reference temperature t1 to the temperature t2, the resistance value of the ink resistance RG represented by the resistance value change curve CR also changes. That is, even when the ink liquid surface distance SZ is the same value, the resistance value of the ink resistance RG represented by the resistance value change curve CR(t1) is different from the resistance value of the ink resistance RG represented by the resistance value change curve CR(t2).

As described above, the resistance value change curve CR related to the present embodiment has the change region A-R1 in a portion where the ink liquid surface distance SZ becomes the distance H1. That is, in the change region A-R1 including the portion where the ink liquid surface distance SZ becomes the distance H1 in the resistance value change curve CR, the resistance value of the ink resistance RG represented by the resistance value change curve CR significantly changes. Therefore, in the vertical axis direction of the graph shown in FIG. 9, a part of the change region A-R1 provided to the resistance value change curve CR(t1) overlaps a part of the change region A-R1 provided to the resistance value change curve CR(t2).

Further, as described above, the resistance value change curve CR related to the present embodiment has the change region A-R2 in a portion where the ink liquid surface distance SZ becomes the distance H2. That is, in the change region A-R2 including the portion where the ink liquid surface distance SZ becomes the distance H2 in the resistance value change curve CR, the resistance value of the ink resistance RG represented by the resistance value change curve CR significantly changes. Therefore, in the vertical axis direction of the graph shown in FIG. 9, a part of the change region A-R2 provided to the resistance value change curve CR(t1) overlaps a part of the change region A-R2 provided to the resistance value change curve CR(t2).

Figure 10:
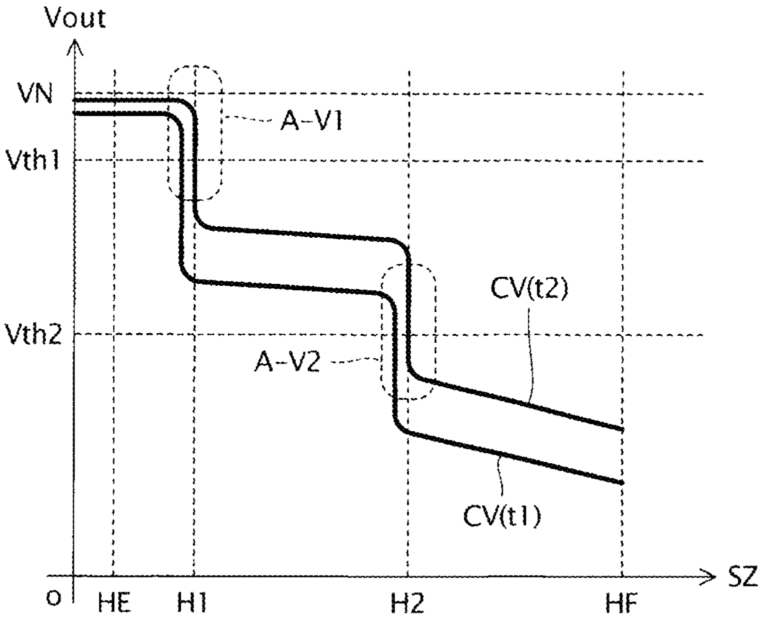
FIG. 10 is a diagram illustrating an example of a temperature change in a potential change curve CV.

FIG. 10 is a diagram illustrating a temperature change of the potential change curve CV with the temperature change of the ink IK in the ink tank TK related to the present embodiment.

Specifically, in FIG. 10, the potential change curve CV when the temperature of the ink IK in the ink tank TK is the reference temperature t1 is represented as the potential change curve CV(t1), and the potential change curve CV when the temperature of the ink IK in the ink tank TK is the temperature t2 is represented as the potential change curve CV(t2).

As shown in FIG. 10, when the temperature of the ink IK in the ink tank TK changes, the potential represented by the potential change curve CV also changes. Specifically, when the temperature of the ink IK in the ink tank TK changes from the reference temperature t1 to the temperature t2, the potential of the output signal Vout represented by the potential change curve CV also changes. That is, even when the ink liquid surface distance SZ is the same value, the potential of the output signal Vout represented by the potential change curve CV(t1) is different from the potential of the output signal Vout represented by the potential change curve CV(t2).

As described above, the potential change curve CV related to the present embodiment has the change region A-V1, which is a region in which the potential of the output signal Vout represented by the potential change curve CV significantly changes in a portion where the ink liquid surface distance SZ becomes the distance H1. Further, the change region A-V1 provided to the potential change curve CV(t1) crosses a straight line “Vout=Vth1” in the graph shown in FIG. 10.

Further, since the change region A-V1 is a region in which the potential of the output signal Vout represented by the potential change curve CV significantly changes, a part of the change region A-V1 provided to the potential change curve CV(t1) and a part of the change region A-V1 provided to the potential change curve CV(t2) overlap each other in the vertical axis direction of the graph shown in FIG. 10. Further, as long as the temperature difference between the reference temperature t1 and the temperature t2 is within a predetermined temperature difference, the change region A-V1 of the potential change curve CV(t2) crosses the straight line “Vout=Vth1” in the graph shown in FIG. 10.

Here, the predetermined temperature difference may be, for example, a temperature difference between the temperature of the ink IK in the ink tank TK and the reference temperature t1 when the inkjet printer 100 is used in a marginal use environment of the inkjet printer 100. Further, the predetermined temperature difference may be, for example, a temperature difference between the ambient temperature of the inkjet printer 100 and the reference temperature t1 when the inkjet printer 100 is used in a marginal use environment of the inkjet printer 100. Further, the predetermined temperature difference may be, for example, a temperature difference between the temperature of the marginal use environment of the ink IK and the reference temperature t1.

As described above, the potential change curve CV related to the present embodiment has the change region A-V2, which is a region in which the potential of the output signal Vout represented by the potential change curve CV significantly changes in a portion where the ink liquid surface distance SZ becomes the distance H2. Further, the change region A-V2 provided to the potential change curve CV(t1) crosses a straight line “Vout=Vth2” in the graph shown in FIG. 10.

Further, since the change region A-V2 is a region in which the potential of the output signal Vout represented by the potential change curve CV significantly changes, a part of the change region A-V2 provided to the potential change curve CV(t1) and a part of the change region A-V2 provided to the potential change curve CV(t2) overlap each other in the vertical axis direction of the graph shown in FIG. 10. Further, as long as the temperature difference between the reference temperature t1 and the temperature t2 is within a predetermined temperature difference, the change region A-V2 of the potential change curve CV(t2) crosses the straight line “Vout=Vth2” in the graph shown in FIG. 10.

Therefore, according to the present embodiment, when the temperature of the ink IK in the ink tank TK is the reference temperature t1, and when the temperature is the temperature t2, it is possible to identify that the remaining amount of the ink IK in the ink tank TK is less than the amount of ink corresponding to the distance H1 based on the fact that the potential of the output signal Vout is higher than the threshold potential Vth1, and to identify that the remaining amount of the ink IK in the ink tank TK is less than the amount of ink corresponding to the distance H2 based on the fact that the potential of the output signal Vout is higher than the threshold potential Vth2.

Meanwhile, according to the reference example, similarly to the present embodiment, when the temperature of the ink IK in the ink tank TK-W is the reference temperature t1 and when the temperature is the temperature t2, it is possible to identify that the remaining amount of the ink IK in the ink tank TK-W is less than the amount of ink corresponding to the distance H1 based on the fact that the potential of the output signal Vout-W is higher than the threshold potential Vth1. However, according to the reference example, unlike the present embodiment, when the temperature of the ink IK in the ink tank TK-W is the reference temperature t1 and when the temperature is the temperature t2, the remaining amount of the ink IK in the ink tank TK-W cannot be identified based on the fact that the potential of the output signal Vout-W is higher than the threshold potential Vth2.

That is, according to the inkjet printer 100 related to the present embodiment, it becomes possible to accurately detect the remaining amount of the ink IK in the ink tank TK based on the output signal Vout compared to the inkjet printer according to the reference example.

Note that in the present embodiment, the description is presented illustrating when a change occurs in the resistance value of the ink resistance RG due to a temperature change of the ink IK in the ink tank TK, and as a result, a change occurs in the potential of the output signal Vout represented by the potential change curve CV, but the present disclosure is not limited to such an aspect. The present embodiment can be applied to any case where a variation occurs in the potential of the output signal Vout represented by the potential change curve CV.

For example, according to the present embodiment, even when a change occurs in the potential of the output signal Vout represented by the potential change curve CV due to deterioration or denaturation of the ink IK in the ink tank TK, the remaining amount of the ink IK in the ink tank TK can be accurately detected based on the output signal Vout compared to the reference example. Further, according to the present embodiment, even when a change occurs in the potential of the output signal Vout represented by the potential change curve CV due to the superimposition of noise on the output signal Vout, the remaining amount of the ink IK in the ink tank TK can be accurately detected based on the output signal Vout compared to the reference example.

5. Conclusion of Embodiment

As described hereinabove, the inkjet printer 100 according to the present embodiment includes the ink tanks TK storing conductive ink IK, the electrode rod BT housed in the ink liquid chamber RM1 in the ink tank TK, the electrode rod BK housed in the ink liquid chamber RM2 in the ink tank TK, the partition wall WL which is housed in the ink tank TK and partitions the ink liquid chamber RM1 and the ink liquid chamber RM2, the ink amount detection circuit 2 which is electrically coupled to the electrode rod BT and the electrode rod BK and outputs the output signal Vout corresponding to the electric signal from the electrode rod BK, and the control device 8 for identifying the remaining amount of the ink IK stored in the ink tank TK based on the output signal Vout, wherein the lower opening OP1 communicating the ink liquid chamber RM1 and the ink liquid chamber RM2 with each other is formed at the Z1 direction side of the partition wall WL, the upper opening OP2 communicating the ink liquid chamber RM1 and the ink liquid chamber RM2 with each other is formed at the Z2 direction side of the partition wall WL, and the electrode rod BT and the electrode rod BK come in contact with the ink IK stored in the ink tank TK when the ink IK stored in the ink tank TK is present in the lower opening OP1 and the upper opening OP2.

That is, in the present embodiment, the electrode rod BT and the electrode rod BK can take any one of three coupling states, namely, a first coupling state in which the electrode rod BT and the electrode rod BK are not electrically coupled to each other with the ink IK in the ink tank TK, a second coupling state in which the electrode rod BT and the electrode rod BK are electrically coupled to each other with the ink IK in the lower opening OP1, and a third coupling state in which the electrode rod BT and the electrode rod BK are electrically coupled to each other with the ink IK in the lower opening OP1 and the upper opening OP2, in accordance with the remaining amount of the ink IK in the ink tank TK. Therefore, in the present embodiment, when the remaining amount of the ink IK in the ink tank TK changes, the ink amount detection circuit 2 can significantly change the potential of the output signal Vout at the boundary between the first coupling state and the second coupling state and the boundary between the second coupling state and the third coupling state. Thus, according to the present embodiment, it becomes possible to accurately detect the remaining amount of the ink IK in the ink tank TK compared to the related-art aspect in which the potential of the output signal Vout smoothly changes even when the remaining amount of the ink IK in the ink tank TK changes.

Further, the inkjet printer 100 according to the present embodiment is characterized in that the cross-sectional area of the lower opening OP1 is smaller than the cross-sectional area of the upper opening OP2.

Therefore, according to the present embodiment, it is possible to increase the amount of change in the output signal Vout at the boundary between the second coupling state and the third coupling state compared to when the cross-sectional area of the lower opening OP1 is larger than the cross-sectional area of the upper opening OP2. Accordingly, according to the present embodiment, it becomes possible to accurately detect the remaining amount of the ink IK in the ink tank TK compared to when the cross-sectional area of the lower opening OP1 is larger than the cross-sectional area of the upper opening OP2.

Further, the inkjet printer 100 according to the present embodiment is characterized in that the resistance value of the electric resistance between the electrode rod BT and the electrode rod BK when the ink IK stored in the ink tank TK is present in the upper opening OP2 is smaller than the resistance value of the electric resistance between the electrode rod BT and the electrode rod BK when the ink IK contained in the ink tank TK is absent in the upper opening OP2.

Further, the inkjet printer 100 according to the present embodiment is characterized in that the resistance value of the electric resistance between the electrode rod BT and the electrode rod BK when the ink IK stored in the ink tank TK is present in the lower opening OP1 is equal to or smaller than the resistance value of the electric resistance between the electrode rod BT and the electrode rod BK when the ink IK stored in the ink tank TK is absent in the lower opening OP1.

Further, the inkjet printer 100 according to the present embodiment may be characterized in that when the ink IK stored in the ink tank TK is present in the upper opening OP2, the control device 8 identifies the remaining amount of the ink IK stored in the ink tank TK as an amount based on the maximum amount of the ink IK that can be stored in the ink tank TK.

In this case, when the ink IK is replenished in the ink tank TK, it becomes possible to confirm in advance the possibility that the ink IK overflows from the ink tank TK.

Further, the inkjet printer 100 according to the present embodiment may be characterized in that when a change from a state in which the electrode rod BT and the electrode rod BK are electrically coupled to each other with the ink IK stored in the ink tank TK to a state in which at least one of the electrode rod BT and the electrode rod BK is not in contact with the ink IK stored in the ink tank TK occurs, the control device 8 identifies the remaining amount of the ink IK stored in the ink tank TK as an amount based on the minimum amount of the ink IK in the ink tank TK.

In this case, it becomes possible to confirm in advance the depletion of the ink IK in the ink tank TK.

Further, the inkjet printer 100 according to the present embodiment is characterized in that the partition wall WL is formed of an insulator.

Therefore, according to the present embodiment, it becomes possible to accurately detect the remaining amount of the ink IK in the ink tank TK compared to an aspect in which the partition wall WL is formed of a conductive material.

Further, the inkjet printer 100 according to the present embodiment is characterized in that the ink tank TK includes the supply port 12 for supplying the ink IK in an internal space for the ink tank TK to store the ink IK.

B. Modified Examples

The aspects exemplified hereinabove can variously be modified. Specific aspects of the modification will be exemplified below. Two or more aspects randomly selected from the following exemplifications can be combined as appropriate within a range in which no mutual confliction exists.

B. 1. Modified Example 1

In the present embodiment described above, the description is presented citing when the ink storage device 1 includes the output circuit 20 as an example, but the present disclosure is not limited to such an aspect. It is sufficient for the ink storage device 1 to include the output circuit 20 capable of detecting the remaining amount of the ink IK stored in the ink tank TK based on an electric signal from one electrode rod or a plurality of electrode rods provided to the ink tank TK.

Figure 11:
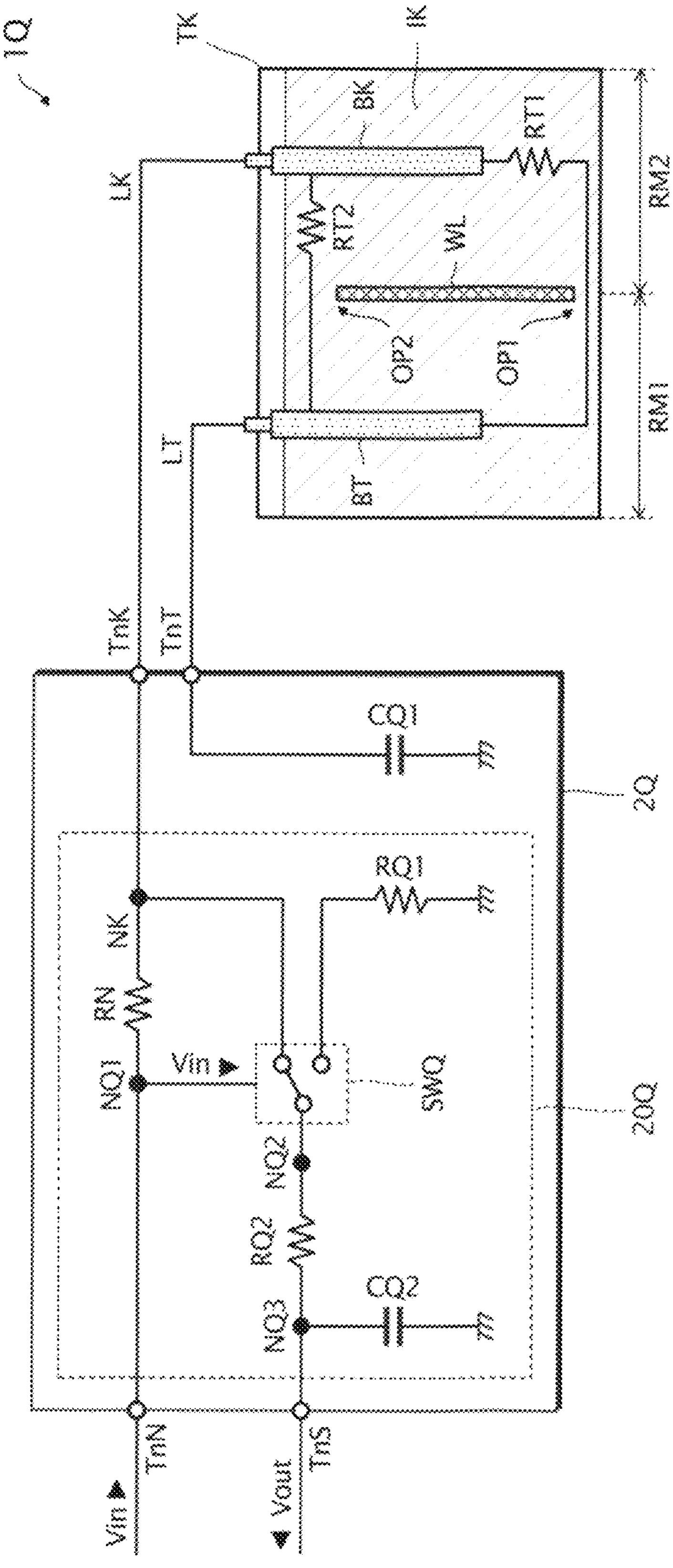
FIG. 11 is a circuit diagram illustrating an example of a configuration of an ink storage device 1Q according to Modified Example 1.

FIG. 11 is a circuit diagram illustrating an example of a configuration of an ink storage device 1Q provided to an inkjet printer according to Modified Example 1. Note that the inkjet printer according to Modified Example 1 is different from the inkjet printer 100 according to the embodiment in that an ink storage device 1Q is provided instead of the ink storage device 1. Further, the ink storage device 1Q is different from the ink storage device 1 according to the embodiment in that an ink amount detection circuit 2Q is provided instead of the ink amount detection circuit 2. That is, the ink storage device 1Q includes an ink amount detection circuit 2Q and the ink tank TK.

As illustrated in FIG. 11, the ink amount detection circuit 2Q includes the input terminal TnN, the detection terminal Ink, the reference potential coupling terminal InT, the output terminal TnS, a capacitance CQ1, and an output circuit 200 including a node NK.

The input signal Vin is input to the input terminal TnN. The detection terminal TnK is electrically coupled to the electrode rod BK via the detection wiring LK. The reference potential coupling terminal TnT is electrically coupled to the electrode rod BT via the reference potential coupling wiring LT. The output terminal TnS outputs the output signal Vout. In the capacitance CQ1, one of two electrodes provided to the capacitance CQ1 is electrically coupled to the reference potential coupling terminal TnT, and the other electrode is electrically coupled to wiring set to the ground potential.

The output circuit 20Q includes the node NK, a node NQ1, a node NQ2, a node NQ3, the input resistor RN, a resistor RQ1, a resistor RQ2, a capacitance CQ2, and a switch SWQ.

The node NK is electrically coupled to the detection terminal TnK and is electrically coupled to one end of the input resistor RN.

The node NQ1 is electrically coupled to the other end of the input resistor RN, is electrically coupled to the input terminal TnN, and is supplied with the input signal Vin via the input terminal TnN.

The switch SWQ has two input terminals, one output terminal, and one control terminal. Out of the two input terminals of the switch SWQ, one input terminal is electrically coupled to the node NK, and the other input terminal is electrically coupled to one end of the resistor RQ1. The output terminal of the switch SWQ is electrically coupled to the node NQ2. The input signal Vin is supplied to the control terminal provided to the switch SWQ via the node NQ1.

In the present modified example, the input signal Vin is a signal that is set to one of signal levels, namely a high level and a low level.

Further, in the present modified example, when the input signal Vin supplied to the switch SWQ is at the low level, the switch SWQ electrically couples the output terminal of the switch SWQ to one of the two input terminals of the switch SWQ. That is, in the present modified example, when the input signal Vin supplied to the switch SWQ is at the low level, the switch SWQ electrically couples the node NK and the node NQ2 to each other.

Further, in the present modified example, when the input signal Vin supplied to the switch SWQ is at the high level, the switch SWQ electrically couples the output terminal of the switch SWQ to the other of the two input terminals of the switch SWQ. That is, in the present modified example, when the input signal Vin supplied to the switch SWQ is at the high level, the switch SWQ electrically couples one end of the resistor RQ1 and the node NQ2 to each other.

One end of the resistor RQ1 is electrically coupled to the other input terminal of the two input terminals of the switch SWQ, and the other end is electrically coupled to the wiring set to the ground potential.

One end of the resistor RQ2 is electrically coupled to the node NQ2, and the other end thereof is electrically coupled to the node NQ3.

In the capacitance CQ2, one of the two electrodes provided to the capacitance CQ2 is electrically coupled to the node NQ3, and the other electrode is electrically coupled to the wiring set to the ground potential. The resistor RQ2 and the capacitance CQ2 function as a low-pass filter.

The output terminal TnS is electrically coupled to the node NQ3 and outputs the output signal Vout representing the potential of the node NQ3.

Figure 12:
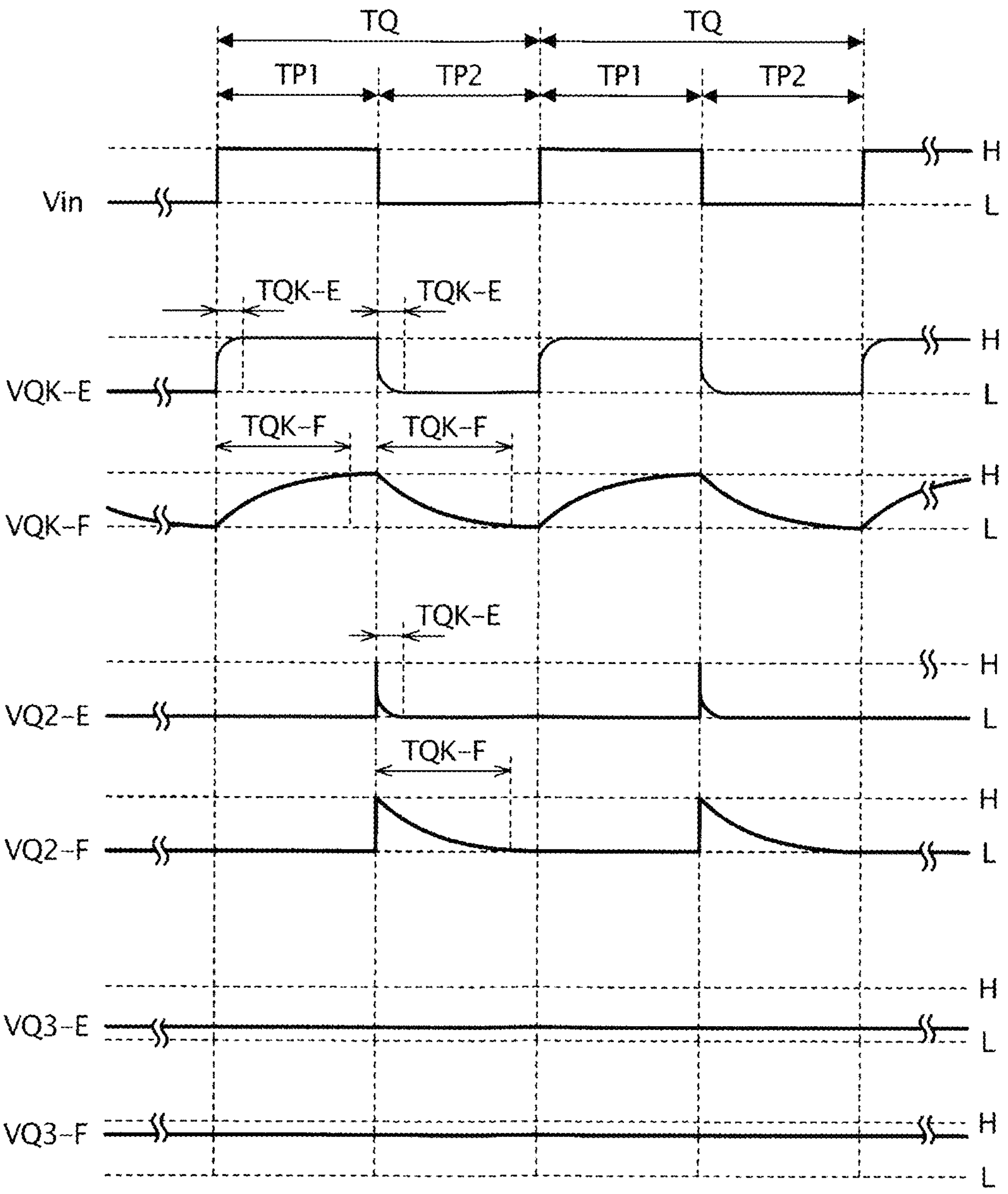
FIG. 12 is a timing chart showing an example of an operation of an ink amount detection circuit 2Q.

FIG. 12 is a timing chart illustrating various signals flowing through the ink amount detection circuit 2Q.

As illustrated in FIG. 12, in the present modified example, it is assumed when the operation period of the ink amount detection circuit 2Q is divided into a plurality of unit periods TQ. In the present modified example, it is assumed when each unit period TQ is divided into a control period TP1 and a control period TP2.

The input signal Vin is set to the high level in the control period TP1 out of the unit periods TQ, and is set to the low level in the control period TP2 out of the unit periods TQ.

The signal VOK is a signal representing the potential of the node NK. In the following description, the signal VOK when the ink IK stored in the ink tank TK is less than the amount of ink corresponding to the distance H1, that is, when the ink IK in the ink tank TK is exhausted, is referred to as a signal VQK-E. Further, the signal VQK when the ink IK stored in the ink tank TK is larger in amount than the amount of ink corresponding to the distance H2, that is, when the ink IK in the ink tank TK is abundant, is referred to as a signal VQK-F.

When the ink IK in the ink tank TK is exhausted, the electrode rod BT and the electrode rod BK are in the state of not being electrically coupled to each other. Therefore, the signal VQK-E exhibits a waveform having a shape interlocked with the input signal Vin. Specifically, the signal VQK-E rises from the low level to the high level after being delayed by the time TQK-E from the timing at which the input signal Vin rises from the low level to the high level, and falls from the high level to the low level after being delayed by the time TQK-E from the timing at which the input signal Vin falls from the high level to the low level. Here, the time TQK-E is a time shorter than the time length of the control period TP1 and shorter than the time length of the control period TP2, and is a time for charging a capacitance parasitic on the detection wiring LK, the electrode rod BK, and so on.

When the ink IK in the ink tank TK is abundant, the electrode rod BT and the electrode rod BK are in the state of being electrically coupled to each other. For this reason, the signal VQK-F exhibits a waveform having a shape obtained by dulling the input signal Vin. Specifically, the signal VQK-F rises from the low level to the high level after being delayed by the time TQK-F from the timing at which the input signal Vin rises from the low level to the high level, and falls from the high level to the low level after being delayed by the time TQK-F from the timing at which the input signal Vin falls from the high level to the low level. Here, the time TQK-F is a time longer than the time TQK-E, and is a time for charging the capacitance parasitic on the reference potential coupling wiring LT, the electrode rod BT, and so on and the capacitance CQ1 in addition to the capacitance parasitic on the detection wiring LK, the electrode rod BK, and so on.

The signal VQ2 is a signal representing the potential of the node NQ2. The signal VQ2 when the ink IK in the ink tank TK is exhausted and the ink liquid surface distance SZ in the ink tank TK is less than the distance H1 is hereinafter referred to as a signal VQ2-E. Further, the signal VQ2 when the ink IK in the ink tank TK is abundant and the ink liquid surface distance SZ in the ink tank TK is longer than the distance H2 is referred to as a signal VQ2-F.

As described above, in the control period TP1 in which the input signal Vin is at the high level, the switch SWQ electrically couples the node NQ2 and one end of the resistor RQ1 to each other. Therefore, in the control period TP1, the signal VQ2 is set to the low level.

Further, in the control period TP2 in which the input signal Vin is at the low level, the switch SWQ electrically couples the node NQ2 and the node NK to each other. Therefore, in the control period TP2, the signal VQ2-E exhibits a waveform having such a shape that the time TQK-E is required to fall from the high level to the low level. In addition, in the control period TP2, the signal VQ2-F exhibits a waveform having such a shape that the time TQK-F is required to fall from the high level to the low level.

The signal VQ3 is a signal representing the potential of the node NQ3. The signal VQ3 when the ink IK in the ink tank TK is exhausted and the ink liquid surface distance SZ in the ink tank TK is less than the distance H1 is hereinafter referred to as a signal VQ3-E. Further, the signal VQ3 when the ink IK in the ink tank TK is abundant and the ink liquid surface distance SZ in the ink tank TK is longer than the distance H2 is referred to as a signal VQ3-F.

As described above, the resistor RQ2 and the capacitance CQ2 function as the low-pass filter. Therefore, the signal VQ3 is a signal having a waveform obtained by removing a high-frequency component from the signal VQ2. As described above, the time TQK-F is longer than the time TQK-E. Therefore, the signal VQ3-F is higher in potential than the signal VQ3-E. That is, in the present modified example, when the ink IK in the ink tank TK is abundant and the ink liquid surface distance SZ is longer than the distance H2 in the ink tank TK, the ink amount detection circuit 2Q outputs the output signal Vout higher in potential compared to when the ink IK in the ink tank TK is exhausted, and the ink liquid surface distance SZ is less than the distance H1 in the ink tank TK.

B. 2. Modified Example 2

In the embodiment and Modified Example 1 described above, the description is presented citing when the M ink amount detection circuits 2 corresponding one-to-one to the M ink tanks TK[1] to TK[M] are provided in the ink storage device 1 as an example, but the present disclosure is not limited to such an aspect. The ink storage device 1 may be provided with a smaller number of ink amount detection circuits 2 than M.

For example, the ink storage device 1 may be provided with a single ink amount detection circuit 2. In this case, for example, the ink amount detection circuit 2 may divide the operation period of the ink amount detection circuit 2 into M unit operation periods and detect the remaining amount of the ink IK stored in the ink tank T[m] in the m-th unit operation period. Specifically, the ink amount detection circuit 2 may be configured to switch the ink tank TK[m] to which the ink amount detection circuit 2 is coupled for each unit operation period.

B. 3. Modified Example 3

In the embodiment, Modified Example 1, and Modified Example 2 described above, a serial inkjet printer in which the housing case 921 on which the liquid ejection head HU is mounted is reciprocated in the main scanning direction MH1 is exemplified, but the present disclosure is not limited to such an aspect. The inkjet printer may be a line-type liquid ejection apparatus including a liquid ejecting head HU capable of ejecting the ink IK over the entire width of the medium PP.

B. 4. Modified Example 4

In the embodiment and Modified Example 1 to Modified Example 3 described above, the liquid ejection apparatus described exemplifying the inkjet printer may be employed in various apparatuses such as a facsimile apparatus and a copier, in addition to apparatuses dedicated to printing. However, the usage of the liquid ejection apparatus of the present disclosure is not limited to printing. For example, the liquid ejection apparatus for ejecting a solution of a coloring material is used as a manufacturing apparatus for forming a color filter of a liquid crystal display apparatus. Further, the liquid ejection apparatus that ejects a solution of a conductive material is used as a manufacturing apparatus that forms wiring and electrodes of a wiring board.

What is claimed is:

1. A liquid ejection apparatus comprising:

a storage container configured to store a liquid having conductivity;

a first electrode housed in a first liquid chamber of the storage container;

a second electrode housed in a second liquid chamber of the storage container;

a partition wall which is housed in the storage container, and is configured to partition the first liquid chamber and the second liquid chamber;

a detection unit which is electrically coupled to the first electrode and the second electrode, and is configured to output a detection signal corresponding to an electrical signal from one of the first electrode and the second electrode; and an identification unit configured to identify a remaining amount of the liquid stored in the storage container based on the detection signal, wherein a first opening communicating the first liquid chamber and the second liquid chamber with each other is formed below the partition wall, a second opening communicating the first liquid chamber and the second liquid chamber with each other is formed above the partition wall, and when the liquid stored in the storage container is present in the first opening and the second opening, the first electrode and the second electrode are in contact with the liquid stored in the storage container.

2. The liquid ejection apparatus according to claim 1, wherein a cross-sectional area of the first opening is smaller than a cross-sectional area of the second opening.

3. The liquid ejection apparatus according to claim 1, wherein a resistance value of an electric resistance between the first electrode and the second electrode when the liquid stored in the storage container is present in the second opening is smaller than a resistance value of the electric resistance between the first electrode and the second electrode when the liquid stored in the storage container is absent in the second opening.

4. The liquid ejection apparatus according to claim 1, wherein a resistance value of an electric resistance between the first electrode and the second electrode when the liquid stored in the storage container is present in the first opening is equal to or smaller than a resistance value of the electric resistance between the first electrode and the second electrode when the liquid stored in the storage container is absent in the first opening.

5. The liquid ejection apparatus according to claim 1, wherein when the liquid stored in the storage container is present in the second opening, the identification unit is configured to identify the remaining amount of the liquid stored in the storage container as an amount based on a maximum amount of the liquid in the storage container.

6. The liquid ejection apparatus according to claim 1, wherein when a change from a state in which the first electrode and the second electrode are in contact with the liquid stored in the storage container to a state in which at least one of the first electrode and the second electrode fails to have contact with the liquid stored in the storage container occurs, the identification unit is configured to identify the remaining amount of the liquid stored in the storage container as an amount based on a minimum amount of the liquid in the storage container.

7. The liquid ejection apparatus according to claim 1, wherein the partition wall is formed of an insulator.

8. The liquid ejection apparatus according to claim 1, wherein the storage container includes a supply port configured to supply the liquid to an internal space for the storage container to store the liquid.

9. A liquid storage device comprising:

a storage container configured to store a liquid having conductivity;

a first electrode housed in a first liquid chamber of the storage container;

a second electrode housed in a second liquid chamber of the storage container;

a partition wall which is housed in the storage container, and is configured to partition the first liquid chamber and the second liquid chamber; and a detection unit which is electrically coupled to the first electrode and the second electrode, and is configured to output a detection signal corresponding to an electrical signal from one of the first electrode and the second electrode, wherein a first opening communicating the first liquid chamber and the second liquid chamber with each other is formed below the partition wall, a second opening communicating the first liquid chamber and the second liquid chamber with each other is formed above the partition wall, and when the liquid stored in the storage container is present in the first opening and the second opening, the first electrode and the second electrode are in contact with the liquid stored in the storage container.

10. The liquid storage device according to claim 9, wherein a cross-sectional area of the first opening is smaller than a cross-sectional area of the second opening.

11. The liquid storage device according to claim 9, wherein a resistance value of an electric resistance between the first electrode and the second electrode when the liquid stored in the storage container is present in the second opening is smaller than a resistance value of the electric resistance between the first electrode and the second electrode when the liquid stored in the storage container is absent in the second opening.

12. The liquid storage device according to claim 9, wherein a resistance value of an electric resistance between the first electrode and the second electrode when the liquid stored in the storage container is present in the first opening is equal to or smaller than a resistance value of the electric resistance between the first electrode and the second electrode when the liquid stored in the storage container is absent in the first opening.

13. The liquid storage device according to claim 9, wherein when the liquid stored in the storage container is present in the second opening, the detection unit is configured to output the detection signal for identifying a remaining amount of the liquid stored in the storage container as an amount based on a maximum amount of the liquid in the storage container.

14. The liquid storage device according to claim 9, wherein when a change from a state in which the first electrode and the second electrode are in contact with the liquid stored in the storage container to a state in which at least one of the first electrode and the second electrode fails to have contact with the liquid stored in the storage container occurs, the detection unit is configured to output the detection signal for identifying a remaining amount of the liquid stored in the storage container as an amount based on a minimum amount of the liquid in the storage container.

15. The liquid storage device according to claim 9, wherein the partition wall is formed of an insulator.

16. The liquid storage device according to claim 9, wherein the storage container includes a supply port configured to supply the liquid to an internal space for the storage container to store the liquid.

* * * * *